(12) United States Patent
Kaehler et al.

(10) Patent No.: US 11,126,842 B2
(45) Date of Patent: Sep. 21, 2021

(54) EYE POSE IDENTIFICATION USING EYE FEATURES

(71) Applicant: Magic Leap, Inc., Plantation, FL (US)

(72) Inventors: Adrian Kaehler, Los Angeles, CA (US); Michael Anthony Klug, Austin, TX (US); Gholamreza Amayeh, Santa Clara, CA (US)

(73) Assignee: Magic Leap, Inc., Plantation, FL (US)

( * ) Notice: Subject to any disclaimer, the term of this patent is extended or adjusted under 35 U.S.C. 154(b) by 209 days.

(21) Appl. No.: 16/223,611

(22) Filed: Dec. 18, 2018

(65) Prior Publication Data

US 2019/0114480 A1 Apr. 18, 2019

Related U.S. Application Data

(62) Division of application No. 15/291,929, filed on Oct. 12, 2016, now Pat. No. 10,163,010.

(Continued)

(51) Int. Cl.
*G06K 9/00* (2006.01)
*G06T 15/00* (2011.01)
(Continued)

(52) U.S. Cl.
CPC ..... *G06K 9/00617* (2013.01); *G02B 27/0093* (2013.01); *G02B 27/017* (2013.01);
(Continued)

(58) Field of Classification Search
USPC .............................. 382/117; 345/419; 348/53
See application file for complete search history.

(56) References Cited

U.S. PATENT DOCUMENTS 5,291,560 A 3/1994 Daugman
5,583,795 A 12/1996 Smyth
(Continued)

FOREIGN PATENT DOCUMENTS

CN 102629319 A 8/2012
CN 103164704 A 6/2013
(Continued)

OTHER PUBLICATIONS

European Extended Search Report, re EP Application No. 16839825.3, dated Mar. 18, 2019.
(Continued)

*Primary Examiner* — Kathleen Y Dulaney
(74) *Attorney, Agent, or Firm* — Knobbe, Martens, Olson & Bear, LLP

(57) ABSTRACT

Systems and methods for eye pose identification using features of an eye are described. Embodiments of the systems and methods can include segmenting an iris of an eye in the eye image to obtain pupillary and limbic boundaries of the eye, determining two angular coordinates (e.g., pitch and yaw) of an eye pose using the pupillary and limbic boundaries of the eye, identifying an eye feature of the eye (e.g., an iris feature or a scleral feature), determining a third angular coordinate (e.g., roll) of the eye pose using the identified eye feature, and utilizing the eye pose measurement for display of an image or a biometric application. In some implementations, iris segmentation may not be performed, and the two angular coordinates are determined from eye features.

29 Claims, 6 Drawing Sheets

Related U.S. Application Data

(60) Provisional application No. 62/242,838, filed on Oct. 16, 2015.

(51) Int. Cl.
*H04N 9/47* (2006.01)
*G02B 27/00* (2006.01)
*G02B 27/01* (2006.01)
*G06F 3/01* (2006.01)
*G06T 7/60* (2017.01)

(52) U.S. Cl.
CPC ........... *G06F 3/013* (2013.01); *G06K 9/0061* (2013.01); *G06T 7/60* (2013.01); *G02B 2027/014* (2013.01); *G02B 2027/0138* (2013.01); *G02B 2027/0187* (2013.01); *G06T 2207/30196* (2013.01)

(56) References Cited

U.S. PATENT DOCUMENTS

| | | |
|---|---|---|
| 5,719,951 A | 2/1998 | Shackleton et al. |
| 5,774,591 A | 6/1998 | Black et al. |
| 6,095,989 A | 8/2000 | Hay et al. |
| 6,154,559 A | 11/2000 | Beardsley |
| 6,463,176 B1 | 10/2002 | Matsugu et al. |
| 6,850,221 B1 | 2/2005 | Tickle |
| D514,570 S | 2/2006 | Ohta |
| 7,480,396 B2 | 1/2009 | Teiwes et al. |
| 7,682,026 B2 | 3/2010 | Huffman et al. |
| 8,077,914 B1 | 12/2011 | Kaplan |
| 8,248,458 B2 | 8/2012 | Schowengerdt et al. |
| 8,403,479 B2 | 3/2013 | Potze et al. |
| 8,472,681 B2 | 6/2013 | Hamza |
| 8,488,846 B2 | 7/2013 | Hamza |
| 8,693,745 B2 | 4/2014 | Izatt et al. |
| 8,854,491 B2 | 10/2014 | Ford et al. |
| 8,950,867 B2 | 2/2015 | Macnamara |
| 8,958,599 B1 * | 2/2015 | Starner ............... G06K 9/00604 382/103 |
| 9,081,426 B2 | 7/2015 | Armstrong |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,710,707 B1 * | 7/2017 | Mayer ...................... G06T 7/74 |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 10,082,865 B1 * | 9/2018 | Raynal ............... G02B 27/0093 |
| 10,089,526 B2 | 10/2018 | Amayeh et al. |
| 10,146,997 B2 | 12/2018 | Kaehler |
| 10,163,010 B2 | 12/2018 | Kaehler et al. |
| 10,282,611 B2 | 5/2019 | Amayeh et al. |
| 10,671,845 B2 | 6/2020 | Kaehler |
| 2003/0169907 A1 | 9/2003 | Edwards et al. |
| 2005/0069207 A1 | 3/2005 | Zakrzewski et al. |
| 2005/0027386 A1 | 12/2005 | Weigand et al. |
| 2006/0028436 A1 | 2/2006 | Armstrong |
| 2006/0147094 A1 | 7/2006 | Yoo |
| 2006/0165266 A1 | 7/2006 | Hamza |
| 2006/0188144 A1 | 8/2006 | Sasaki et al. |
| 2006/0203088 A1 | 9/2006 | Hammoud et al. |
| 2006/0228005 A1 * | 10/2006 | Matsugu ............ G06K 9/00362 382/116 |
| 2006/0239670 A1 | 10/2006 | Cleveland |
| 2006/0280340 A1 | 12/2006 | Derakhshani et al. |
| 2007/0036397 A1 | 2/2007 | Hamza |
| 2007/0047772 A1 | 3/2007 | Matey et al. |
| 2007/0081123 A1 | 4/2007 | Lewis |
| 2007/0140531 A1 | 6/2007 | Hamza |
| 2007/0274570 A1 | 11/2007 | Hamza |
| 2008/0002262 A1 | 1/2008 | Chirieleison |
| 2008/0069411 A1 | 3/2008 | Friedman et al. |
| 2008/0151186 A1 | 6/2008 | Adachi et al. |
| 2008/0226138 A1 | 9/2008 | Suzuki et al. |
| 2008/0232650 A1 * | 9/2008 | Suzuki ............... G06K 9/00281 382/118 |
| 2008/0253622 A1 | 10/2008 | Tosa et al. |
| 2009/0034803 A1 * | 2/2009 | Matos ....................... G06K 9/00 382/116 |
| 2009/0135537 A1 | 5/2009 | Yasuoka et al. |
| 2009/0175537 A1 | 7/2009 | Tribelhorn et al. |
| 2009/0244274 A1 | 10/2009 | Morita et al. |
| 2009/0252382 A1 | 10/2009 | Liu et al. |
| 2009/0310829 A1 | 12/2009 | Baba et al. |
| 2010/0027890 A1 | 2/2010 | Yoshinaga et al. |
| 2010/0054548 A1 | 3/2010 | Inada |
| 2010/0202669 A1 | 8/2010 | Hollingsworth et al. |
| 2011/0007269 A1 * | 1/2011 | Trumm ................. G02C 13/005 351/204 |
| 2011/0150334 A1 | 6/2011 | Du et al. |
| 2011/0153287 A1 | 6/2011 | Potze et al. |
| 2011/0280454 A1 | 11/2011 | Su et al. |
| 2012/0056872 A1 * | 3/2012 | Kim ..................... H04N 13/302 345/419 |
| 2012/0105609 A1 * | 5/2012 | Qi ............................. A61B 3/08 348/54 |
| 2012/0127062 A1 | 5/2012 | Bar-Zeev et al. |
| 2012/0162549 A1 | 6/2012 | Gao et al. |
| 2012/0163678 A1 | 6/2012 | Du et al. |
| 2012/0207357 A1 | 8/2012 | Bedros et al. |
| 2012/0219189 A1 | 8/2012 | Wu et al. |
| 2013/0050642 A1 * | 2/2013 | Lewis ....................... G02B 7/12 351/204 |
| 2013/0082922 A1 | 4/2013 | Miller |
| 2013/0117377 A1 | 5/2013 | Miller |
| 2013/0125027 A1 | 5/2013 | Abovitz |
| 2013/0169530 A1 | 7/2013 | Bhaskar et al. |
| 2013/0169683 A1 | 7/2013 | Perez et al. |
| 2013/0208234 A1 | 8/2013 | Lewis |
| 2013/0215106 A1 * | 8/2013 | Yamaguchi ............. G06F 3/038 345/419 |
| 2013/0235169 A1 * | 9/2013 | Kato ..................... G02B 27/01 348/53 |
| 2013/0242262 A1 | 9/2013 | Lewis |
| 2013/0321389 A1 * | 12/2013 | Orderud ................... G02C 7/12 345/419 |
| 2014/0015778 A1 * | 1/2014 | Taguchi ................. G06F 3/0488 345/173 |
| 2014/0023240 A1 | 1/2014 | Venkatesha et al. |
| 2014/0071539 A1 | 3/2014 | Gao |
| 2014/0072230 A1 | 3/2014 | Ruan et al. |
| 2014/0133705 A1 | 5/2014 | Hanita et al. |
| 2014/0147022 A1 | 5/2014 | Zhou et al. |
| 2014/0161317 A1 | 6/2014 | Hiramaki et al. |
| 2014/0177023 A1 | 6/2014 | Gao et al. |
| 2014/0177906 A1 | 6/2014 | Horowitz |
| 2014/0218468 A1 | 8/2014 | Gao et al. |
| 2014/0267420 A1 | 9/2014 | Schowengerdt |
| 2014/0267771 A1 | 9/2014 | Lawler |
| 2014/0285404 A1 | 9/2014 | Takano et al. |
| 2014/0285641 A1 * | 9/2014 | Kato ........................ A61B 5/398 348/54 |
| 2014/0285768 A1 * | 9/2014 | Barnard ................. G06T 7/0014 351/206 |
| 2014/0300859 A1 * | 10/2014 | Oz ........................... A61B 3/085 351/201 |
| 2014/0300867 A1 | 10/2014 | Fassi et al. |
| 2014/0306866 A1 | 10/2014 | Miller et al. |
| 2014/0362446 A1 * | 12/2014 | Bickerstaff .......... G02B 27/017 359/630 |

(56) References Cited

U.S. PATENT DOCUMENTS

| | | | |
|---|---|---|---|
| 2015/0009236 A1* | 1/2015 | Saito | G01S 5/163 |
| | | | 345/656 |
| 2015/0016777 A1 | 1/2015 | Abovitz et al. | |
| 2015/0077543 A1* | 3/2015 | Kerr | H04N 5/2256 |
| | | | 348/135 |
| 2015/0103306 A1 | 4/2015 | Kaji et al. | |
| 2015/0105759 A1 | 4/2015 | Morley | |
| 2015/0124069 A1 | 5/2015 | Tsukamoto et al. | |
| 2015/0138066 A1* | 5/2015 | Seok | G06K 9/00597 |
| | | | 345/156 |
| 2015/0139509 A1* | 5/2015 | Yang | G02B 27/017 |
| | | | 382/117 |
| 2015/0178939 A1 | 6/2015 | Bradski et al. | |
| 2015/0205126 A1 | 7/2015 | Schowengerdt | |
| 2015/0215611 A1* | 7/2015 | Wu | H04N 13/275 |
| | | | 345/419 |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0286070 A1* | 10/2015 | Aikawa | A61B 3/0091 |
| | | | 351/159.76 |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0063303 A1 | 3/2016 | Cheung et al. | |
| 2016/0085299 A1 | 3/2016 | Horesh | |
| 2016/0302663 A1* | 10/2016 | Fayolle | G02C 11/10 |
| 2016/0302971 A1 | 10/2016 | Morley et al. | |
| 2017/0053165 A1 | 2/2017 | Kaehler | |
| 2017/0053166 A1 | 2/2017 | Amayeh et al. | |
| 2017/0109580 A1* | 4/2017 | Kaehler | G02B 27/0093 |
| 2018/0025520 A1 | 1/2018 | Huang et al. | |
| 2018/0293429 A1* | 10/2018 | Wechsler | G06K 9/00926 |
| 2019/0087634 A1 | 3/2019 | Kaehler | |
| 2020/0293744 A1 | 9/2020 | Kaehler | |

FOREIGN PATENT DOCUMENTS

| | | |
|---|---|---|
| CN | 103680064 A | 3/2014 |
| CN | 105157563 A | 12/2015 |
| EP | 1 991 946 | 11/2008 |
| EP | 2 138 950 | 12/2009 |
| EP | 2 701 122 | 2/2014 |
| FR | 2915301 | 10/2008 |
| JP | 2004-118757 A | 4/2004 |
| JP | 2005-296349 A | 10/2005 |
| JP | 2005-334402 | 12/2005 |
| JP | 2006-120006 A | 5/2006 |
| JP | WO 2005/008590 | 9/2006 |
| JP | 2007-011667 A | 1/2007 |
| JP | 2008-158922 A | 7/2008 |
| JP | 2009-169745 | 7/2009 |
| JP | 2009-240519 A | 10/2009 |
| JP | 2010-33305 | 2/2010 |
| JP | 2015-90569 | 5/2015 |
| JP | 2015-141312 A | 8/2015 |
| KR | 10-0651753 B1 | 12/2006 |
| WO | WO 2002/064031 | 8/2002 |
| WO | WO 2008/091278 | 7/2008 |
| WO | WO 2009/142740 | 11/2008 |
| WO | WO 2010/129074 | 11/2010 |
| WO | WO 2010/147609 | 12/2010 |
| WO | WO 2012/124146 | 9/2012 |
| WO | WO 2013/077895 | 5/2013 |
| WO | WO 2013/188464 | 12/2013 |
| WO | WO 2017/034860 | 3/2017 |
| WO | WO 2017/034861 | 3/2017 |
| WO | WO 2017/066296 | 4/2017 |

OTHER PUBLICATIONS

European Extended Search Report, re EP Application No. 16839826, dated Mar. 6, 2019.
European Extended Search Report, re EP Application No. 16856097. 7, dated May 8, 2019.
Arvacheh, E.M., et al. "Iris Segmentation: Detecting Pupil, Limbus and Eyelids," Image Processing, 2006, IEEE International Conference, Oct. 1, 2006.
Joshi, N.P., et al., "A novel approach implementation of eyelid detection in biometric applications," Engineering (Nuicone), 2012 NIRMA University International Conference, IEEE Dec. 6, 2012, pp. 1-6.
Wang, Y. et. al., "A novel eyelid detection method for iris segmentation," Proc. of SPIE vol. 6833, 68330m, Nov. 2007.
Invitation to Pay Additional Fees for PCT Application No. PCT/US16/56602, dated Dec. 9, 2016.
International Search Report and Written Opinion for PCT Application No. PCT/US16/56602, dated Mar. 27, 2017.
International Preliminary Report on Patentability for PCT Application No. PCT/US16/56602, dated Apr. 17, 2018.
Alonso-Fernandez, F. et al., "Iris Recognition Based on SIFT Features", ATVS, Universidad Autonoma de Madrid, Spain, Sep. 2009, in 28 pages.
Annapoorani G. et al., "Accurate and Fast Iris Segmentation", Inter J Engin Science Tech. (Jul. 2010) 2(6):1492-1499.
Daugman, J. et al., "Epigenetic randomness, complexity and singularity of human iris patterns", Proceedings of Royal Society: Biological Sciences, vol. 268, Aug. 22, 2001, in 4 pages.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Derpanis, K., "Overview of the RANSAC Algorithm", dated May 13, 2010, in 2 pages.
Hansen, D. et al., "In the Eye of the Beholder: A Survey of Models for Eyes and Gaze", IEE Transactions on Pattern Analysis and Machine Intelligence, vol. 32, No. 3, , Mar. 2010, in 23 pages.
Li, D. et al., "Starburst: A hybrid algorithm for video-based eye tracking combining feature-based and model-based approaches", IEEE CVPR Workshop on V4HCI, Jun. 2005, in 8 pages.
Rublee, E. et al., "ORB: an efficient alternative to SIFT or SURF", Menlo Park, California, Nov. 2011, in 8 pages.
ARToolKit: https://web.archive.org/web/20051013062315/http://www.hitl.washington.edu:80/artoolkit/documentation/hardware.htm, archived Oct. 13, 2005.
Aydi W., et al., "A fast and accurate eyelids and eyelash detection approach for iris segmentation," Published in: 2013 World Congress on Computer and Information Technology (WCCIT), Jun. 22-24, 2013.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Hashimoto, "High precision measurement of rotational eye movements implementing the compensation for iris pattern stretches," Technical Report from Institute of Electronics, Information and Communication Engineers, Japan, the Institute of Electronics Information and Communication Engineers, Mar. 6, 2008, vol. 107, No. 541, pp. 61-64.
Jacob, "Eye Tracking in Advanced Interface Design," Human-Computer Interaction Lab Naval Research Laboratory, Washington,

(56) References Cited

OTHER PUBLICATIONS

D.C. / paper/ in Virtual Environments and Advanced Interface Design, ed. by W. Barfield and T.A. Furness, pp. 258-288, Oxford University Press, New York (1995).
Kitagawa, et al., "ConDensation," IPSJ SIG Technical Report, with Abstract, 2005-CVIM-150 (3), Sep. 5, 2005.
Nouvir Lighting, "Don't Be LED Down The Garden Path (Part 1)—Color In "White" LEDs", <URL: https://web.archive.org/web/20121201063926/http://www.nouvir.com/index.cfm?ref=90200&ref2=8> published on Dec. 1, 2012 as per Wayback Machine.
Photonstar Technology LTD., How LEDs Produce White Light, <URL:https://web.archive.org/web/20130705033334/http://www.photonstartechnology.com/learn/how_leds_produce_white_light> published on Jul. 5, 2013 as per Wayback Machine.
Sumi, Kouseido-ka suru kojin ninsyo gijutsu (personal authentication technology this is becoming more accurate), NOTS Inc., Takashi Yoshida, Nov. 18, 2014, 1st edition, pp. 279-294.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

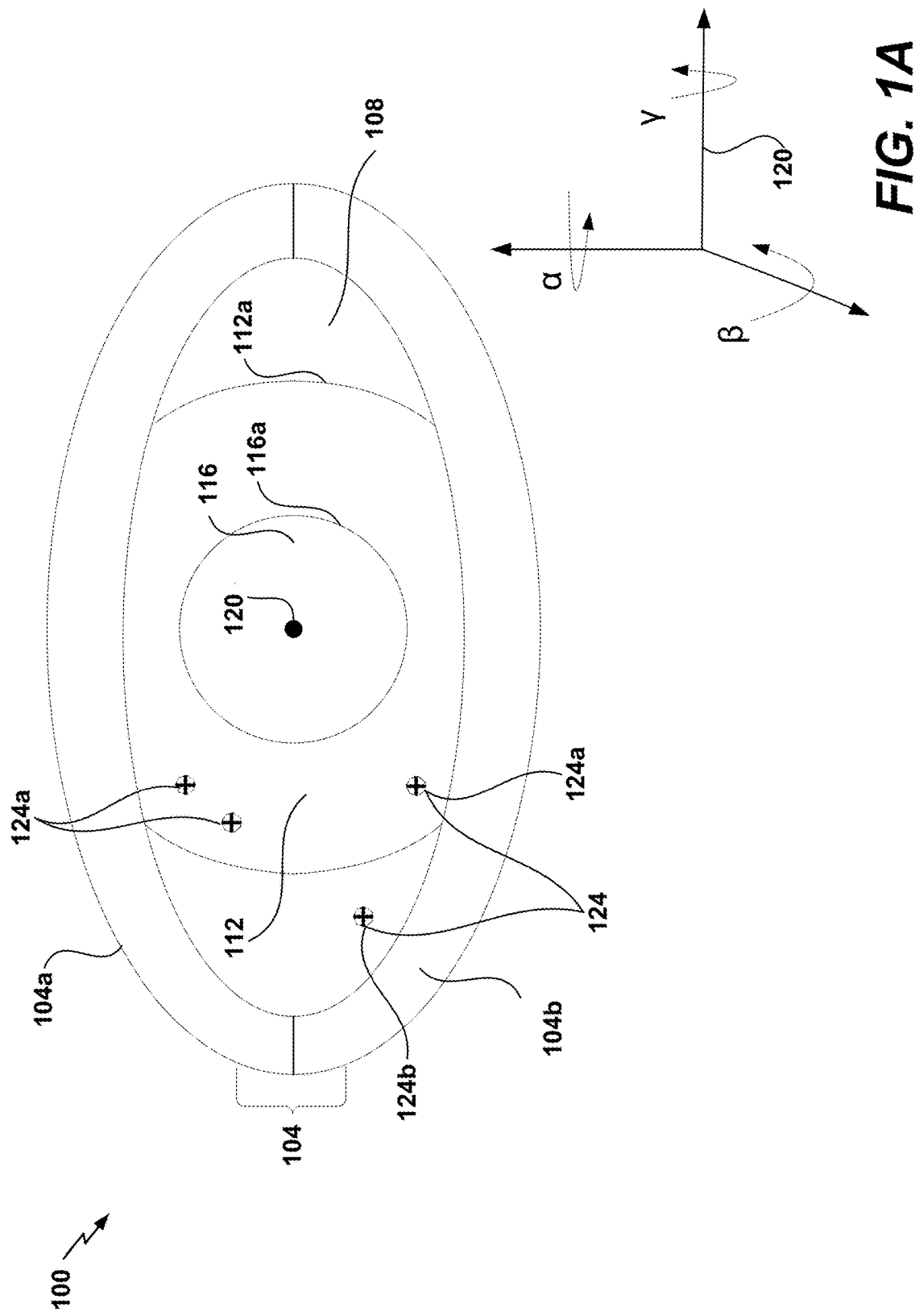

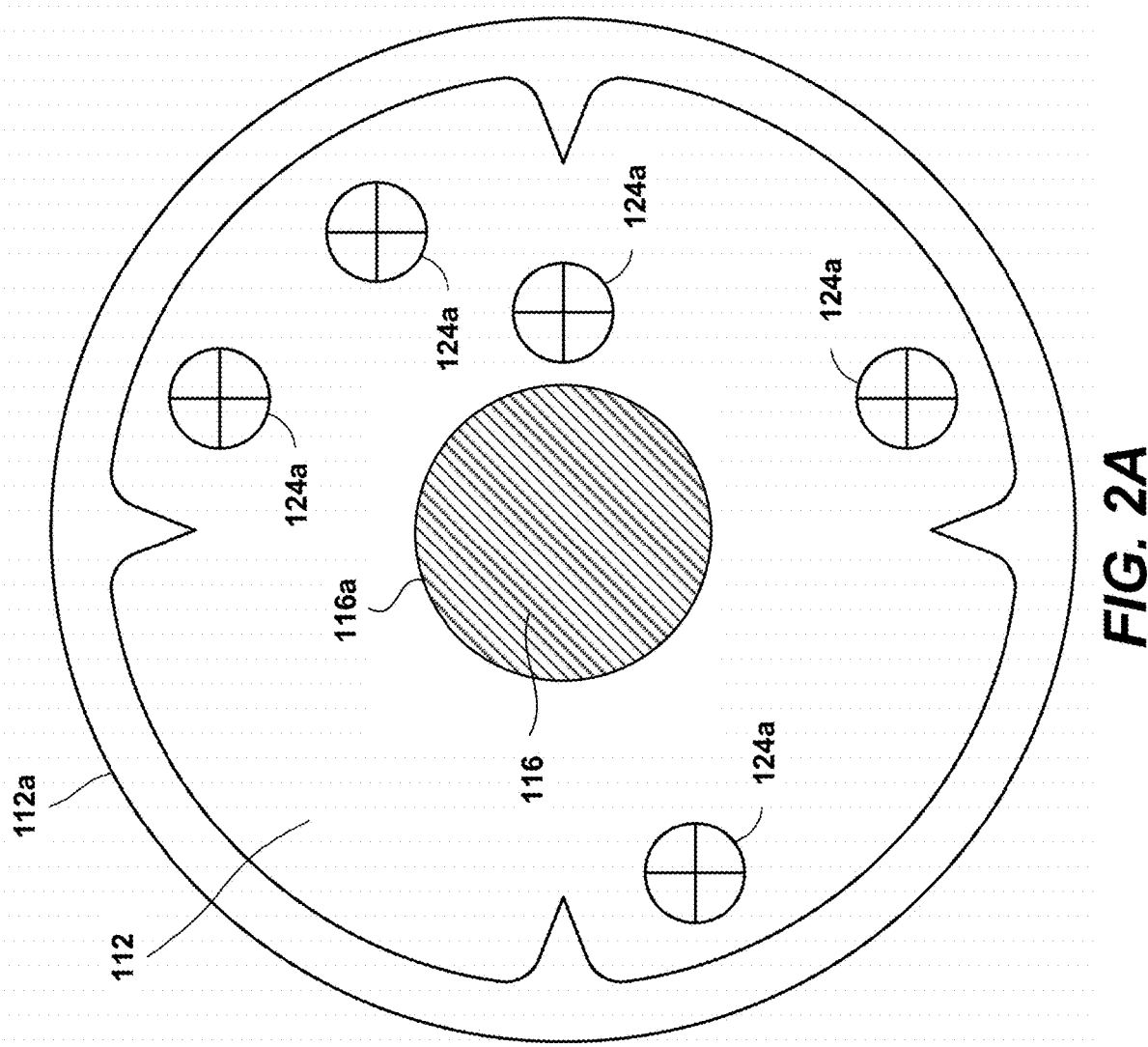

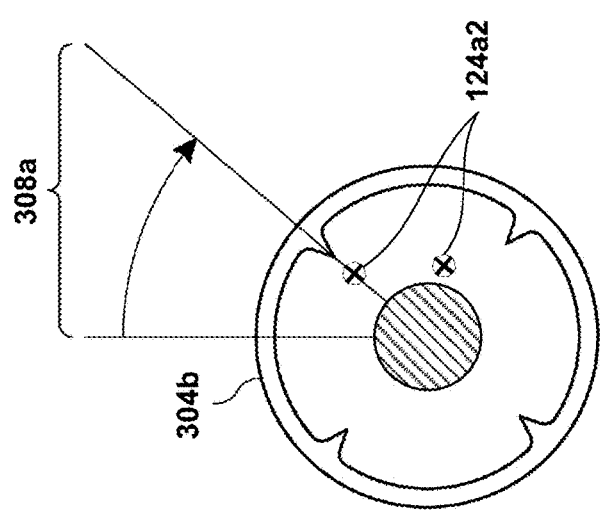
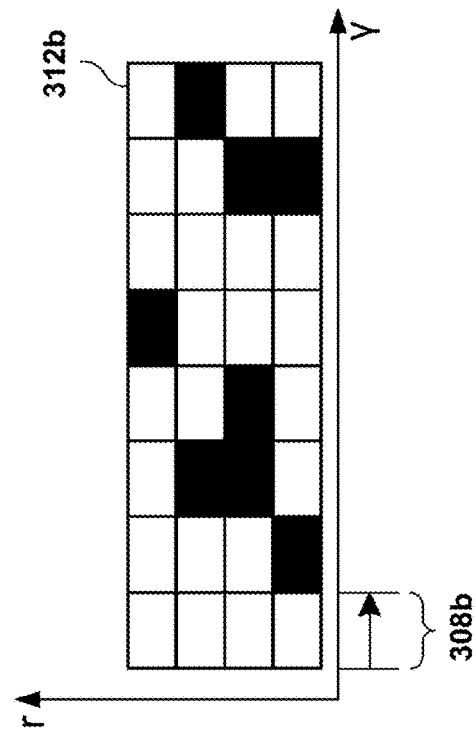
FIG. 3B
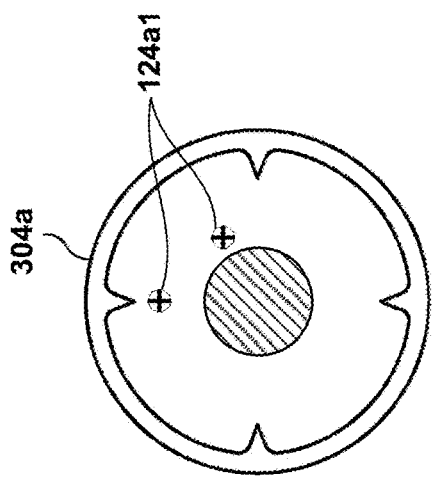
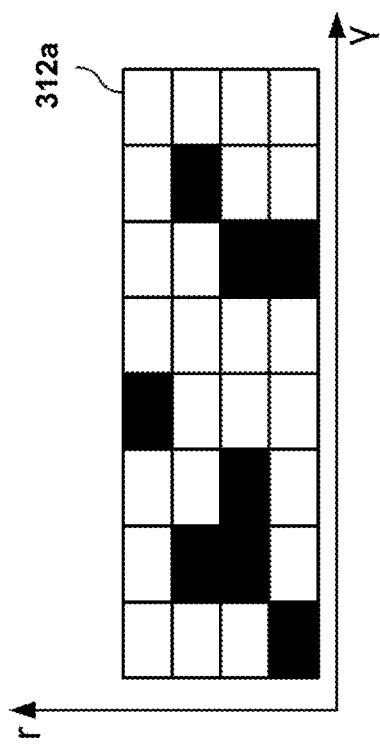
FIG. 3A

US 11,126,842 B2

EYE POSE IDENTIFICATION USING EYE FEATURES

CROSS-REFERENCE TO RELATED APPLICATIONS

This application is a division of U.S. application Ser. No. 15/291,929, filed on Oct. 12, 2016, which claims the benefit of priority under 35 U.S.C. § 119(e) to U.S. Provisional Application No. 62/242,838, filed on Oct. 16, 2015, entitled "EYE POSE IDENTIFICATION USING EYE FEATURES." Each of the above-identified applications is hereby incorporated by reference herein in its entirety.

BACKGROUND

Field

The present disclosure relates generally to systems and methods for processing eye imagery.

Description of the Related Art

The human iris can be used as a source of biometric information. Biometric information can provide authentication or identification of an individual. The process of extracting biometric information, broadly called a biometric template, typically has many challenges.

SUMMARY

In one aspect, a method for eye pose identification is disclosed. The method is performed under control of a hardware computer processor. The method comprises segmenting an iris of an eye in the eye image to obtain pupillary and limbic boundaries of the eye; determining two angular coordinates of an eye pose measurement using the pupillary and limbus boundaries of the eye; identifying an iris feature of the eye; determining a third angular coordinate of the eye pose measurement using the identified iris feature; and utilizing the eye pose measurement for display of an image or a biometric application. In another aspect, the method for eye pose identification can be performed by a head mounted display system. The iris features can include textures, patterns, or keypoints in the iris. In another aspect, additionally or alternatively to iris features, the method can be implemented using scleral features.

In another aspect, a method for identifying an eye pose from an eye image is described. The method is performed under control of a hardware computer processor and comprises determining a pitch and a yaw of the eye from an eye image; determining a roll of the eye from an eye feature; and determining an eye pose of the eye image based at least partly from the pitch, the yaw, and the roll. A wearable display system can include a processor that performs the method. The eye feature can include an iris feature or a scleral feature.

In another aspect, a method for detecting an error in operation of a head mounted display is disclosed. The method is performed under control of a hardware computer processor and comprises determining a first roll angle of a first eye of a wearer of the head mounted display, determining a second roll angle of a second eye of the wearer of the head mounted display, and detecting an error in operation of the head mounted display operation based at least partly on a comparison of the first roll angle and the second roll angle.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1 schematically illustrates an example of an eye showing eye features.

FIG. 1A shows an example of three angles (e.g., yaw, pitch, and roll) that can be used for measuring eye pose direction relative to a natural, resting state of the eye.

FIGS. 2A-2B schematically illustrate an example eye pose identification system using iris features.

FIGS. 3A-3B schematically illustrate an example of an iris code identification system for identifying an eye pose of an eye.

Figure 2B:
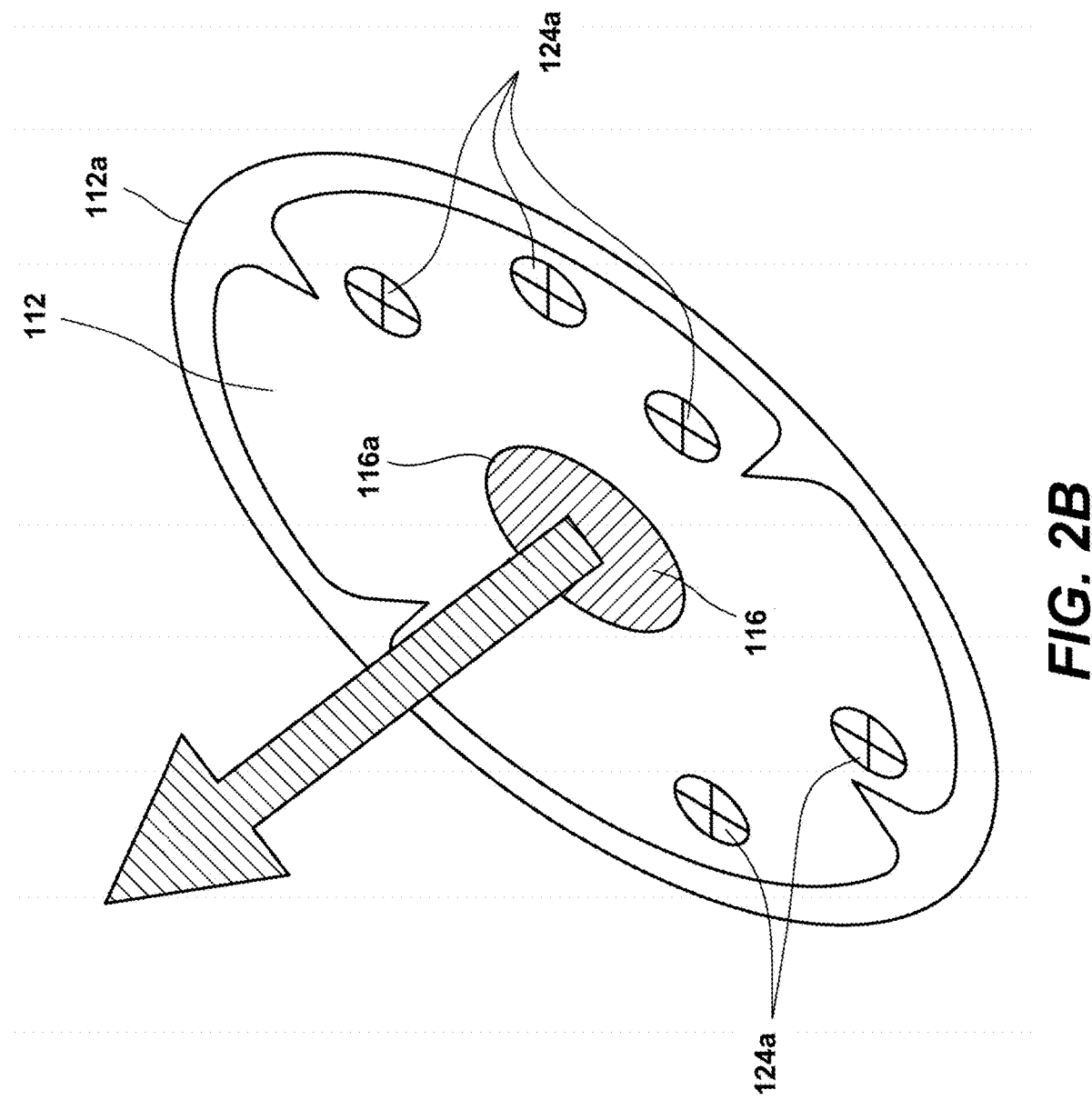

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, including finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (the interior boundary of the iris) and the limbus (the exterior boundary of the iris) can be identified as separate segments of image data.

Further, to obtain biometric information (e.g., an eye pose), algorithms exist for tracking the eye movements of a user of a computer. For example, a camera coupled to a monitor of the computer can provide images for identifying eye movements. However, the cameras used for eye tracking are some distance from the eyes of the user. For example, the camera may be placed at the top of a user's monitor coupled to the computer. As a result, the images of the eyes produced by the camera are, often, produced with poor resolution.

Additionally, the geometry that relates the camera and the user's head is not generally provided a priori to an algorithm tracking the eye movements. As a result, determining the eye pose of a user may present challenges, and may not be easily related to a coordinate system of the user's head. With the techniques disclosed herein, eye pose identification can be used to substantially identify a pointing direction of the eye and also predict the areas of occlusion by the eyelids over the iris. Embodiments of eye pose identification described herein advantageously can be used for estimating the portion of the iris occluded by eyelids. Additionally, in some implementations, this eye pose identification can be used to generate a model for the eyelid location that may be used either in place of, or as a starting point, for segmentation algorithms and for identification of a coordinate frame for a user's head.

In the context of a wearable head mounted display (HMD), cameras may be closer to the user's eyes than a camera coupled to a user's monitor. For example, cameras may be mounted on the wearable HMD, which itself is mounted to a user's head. The proximity of the eyes to such a camera can result in higher resolution eye imagery. Accordingly, it is possible for computer vision techniques to extract visual features from the user's eyes, particularly at the iris (e.g., an iris feature) or in the sclera surrounding the iris (e.g., a scleral feature). For example, when viewed by a camera near the eye, the iris of an eye will show detailed structures. Such iris features are particularly pronounced when observed under infrared illumination and can be used for biometric identification. These iris features are unique from user to user and, in the manner of a fingerprint, can be used to identify the user uniquely. Eye features can include blood vessels in the sclera of the eye (outside the iris), which may also appear particularly pronounced when viewed under red or infrared light.

The present disclosure describes iris features that can be associated with a "descriptor." A descriptor can be a numerical representation of the region near the iris feature. The descriptor can be used for recognition of the same iris feature in another image of the eye. As disclosed herein, such iris features can be used not only to track the motion of the eyes in a general sense, but also to determine the pose of the eye (e.g., gaze direction). For example, computation of a homography that relates two eye images (e.g., a mathematical transformation between the two eye images) can be used to identify the eye pose: the change in the iris features between the two images can indicate a new eye pose (e.g., in one image) relative to an initial eye pose (in another image). Additionally or alternatively to iris features, descriptors for features in the sclera of the eye can be used.

The present disclosure also describes examples of eye pose identification. Using the iris features, a computation of the homography between at least two eye images can be processed using a feature-based tracking technique (FBT), a code-based tracking (CBT) technique, or both. In certain embodiments of both techniques, the iris is first segmented, e.g., the pupil and limbus boundaries of the iris are identified as separate segments of image data. From this segmentation, two angular dimensions of the eye pose can be determined (e.g., pitch and yaw angles). By comparing the iris features, a third angular dimension of the eye pose can be identified (e.g., roll), and, in turn, with all three angular dimensions identified, an eye pose for the eye can be identified. As will be described further below, the feature-based tracking technique and code-based tracking technique may vary in the way that each technique computes the third angular dimension of eye pose (e.g., the roll angle of the eye). In various embodiments, all three angular dimensions of the eye can be determined from a comparison of iris features of various eye images, without necessarily performing iris segmentation on the eye images.

Other challenges may be present when processing eye imagery from a wearable HMD. For example, tracking an eye using images from cameras mounted in an HMD may introduce other problems: eye movement may be difficult to distinguish from HMD movement or movement of the cameras that are mounted to the HMD. However, using the techniques described herein, the challenges present in tracking an eye using images obtained from an HMD can be mitigated by determining the eye pose of the eye in the reference frame of the HMD.

More specifically, current eye imagery processing techniques may not use the roll of the eye, or a third angular dimension of eye pose. However, an estimation of the roll of the eye can be used to measure torsion due to eye movement, noise suppression, or error checking for movement of the HMD Viewed from the perspective of an eye image obtained from a camera mounted to an HMD, the roll angle can correspond to a change of pose of the camera (e.g., a pointing direction of the camera), relative to an orbit around the eye whose axis of rotation is the optical axis of the pupil. To the extent that the exact location of the camera is not known precisely relative to the eye (e.g., in the context of a wearable HMD), the computation of the roll angle of the pupil can be used to determine the location of the camera, and thus the mount of the HMD itself.

Additionally, because the cameras obtaining eye imagery are mounted to an HMD itself, the view direction of the user in a coordinate frame of the head can be determined. As an example, for a head mounted Augmented Reality (AR) device, eye pose identification using the coordinate frame of the HMD itself may be determined.

As used herein, video is used in its ordinary sense and includes, but is not limited to, a recording of a sequence of visual images. Each image in a video is sometimes referred to as an image frame or simply a frame. A video can include a plurality of sequential frames or non-sequential frames, either with or without an audio channel. A video can include a plurality of frames, which are ordered in time or which are not ordered in time. Accordingly, an image in a video can be referred to as an eye image frame or eye image.

Example of an Eye

FIG. 1 illustrates an image of an eye 100 with eyelids 104, sclera 108, iris 112, and pupil 116. Curve 116a shows the pupillary boundary between the pupil 116 and the iris 112, and curve 112a shows the limbic boundary between the iris 112 and the sclera 108 (the "white" of the eye). The eyelids 104 include an upper eyelid 104a and a lower eyelid 104b. The eye 100 is illustrated in a natural resting pose (e.g., in which the user's face and gaze are both oriented as they would be toward a distant object directly ahead of the user). The natural resting pose of the eye 100 can be indicated by a natural resting direction 120, which is a direction orthogonal to the surface of the eye 100 when in the natural resting pose (e.g., directly out of the plane for the eye 100 shown in FIG. 1) and in this example, centered within the pupil 116.

The eye can include eye features 124 in the iris or the sclera (or both) that can be used for eye tracking or biometric applications. FIG. 1 illustrates an example of eye features 124 including iris features 124a and a scleral feature 124b. Eye features 124 can be referred to as individual keypoints. Such eye features may be unique to an individual's eye, and may be distinct for each eye of that individual. An iris feature 124a can be a point of a particular color density, as compared to the rest of the iris color, or as compared to a certain area surrounding that point. As another example, a texture (e.g., a texture that is different from texture of the iris nearby the feature) or a pattern of the iris can be identified as an iris feature 124a. As yet another example, an iris feature 124a can be a scar that differs in appearance from the iris. Eye features 124 can also be associated with the blood vessels of the eye. For example, a blood vessel may exist outside of the iris but within the sclera. Such blood vessels may be more prominently visible under red or infrared light illumination. The scleral feature 124b can be a blood vessel in the sclera of the eye. In some cases, the term eye feature may be used to refer to any type of identifying feature in or on the eye, whether the feature is in the iris, the sclera, or a feature seen through the pupil (e.g., on the retina).

Each eye feature 124 can be associated with a descriptor that is a numerical representation of an area surrounding the eye feature 124. A descriptor can also be referred to as an iris feature representation. As yet another example, such eye features may be derived from scale-invariant feature transforms (SIFT), speeded up robust features (SURF), features from accelerated segment test (FAST), oriented FAST and rotated BRIEF (ORB), KAZE, Accelerated KAZE (AKAZE), etc. Accordingly, eye features 124 may be derived from algorithms and techniques from the field of computer vision known. Such eye features 124 can be referred to as keypoints. In some of the example embodiments described below, the eye features will be described in terms of iris features. This is not a limitation and any type of eye feature (e.g., a scleral feature) can be used, additionally or alternatively, in other implementations.

As the eye 100 moves to look toward different objects, the eye pose will change relative to the natural resting direction 120. The current eye pose can be measured with reference the natural resting eye pose direction 120. The current pose of the eye 100 may be expressed as three angular parameters indicating the current eye pose direction relative to the natural resting direction 120 of the eye. For purposes of illustration, and with reference to an example coordinate system shown in FIG. 1A, these angular parameters can be represented as $\alpha$ (may be referred to as yaw), $\beta$ (may be referred to as pitch), and $\gamma$ (may be referred to as roll). In other implementations, other techniques or angular representations for measuring eye pose can be used, for example, any other type of Euler angle system.

An eye image can be obtained from a video using any appropriate process, for example, using a video processing algorithm that can extract an image from one or more sequential frames. The pose of the eye can be determined from the eye image using a variety of eye-tracking techniques as described herein.

Example of an Eye Pose Identification with Feature-Based Tracking

FIGS. 2A-2B schematically illustrate an example eye pose identification system using iris features. More specifically, FIGS. 2A-2B illustrate a feature-based tracking technique for eye pose identification. The example depicted shows a segmented iris. As depicted in FIG. 2A, iris features 124a are identified in an eye with iris 112 and pupil 116. Curve 116a shows the pupillary boundary between the pupil 116 and the iris 112, and curve 112a shows the limbic boundary between the iris 112 and the sclera. As described above, iris features 124a can be associated with a numerical representation, for example, as computed from the area of the segmented iris.

Iris features 124a can be used to relate any particular image (e.g., the image in FIG. 2B) to a reference image of the eye (e.g., the eye pointing forward in a rest position as shown in FIG. 2A). In this example, FIG. 2A can be an eye as obtained from a reference eye image. FIG. 2B depicts the same eye rotated (toward a pointing direction), as obtained from another eye image. Using the iris features 124a, the homography that relates the position of the iris features 124a in the rotated eye image (e.g., FIG. 2B) to the position in the reference eye image (e.g., FIG. 2A) can be computed. For example, two angular dimensions can be computed using the iris features 124a. Or in another embodiment, the iris may be first segmented with these two angular dimensions computed after that iris segmentation. Because the iris is very nearly flat, a homography can be an appropriate mapping; however, distortion from the cornea may be taken into account, in some implementations, for higher precision results. In one embodiment, the two angular dimensions can be referred to as yaw and pitch. Additionally, as depicted in FIG. 2B, the pointing direction of the eye can be related to a third angular dimension. The third angular dimension can be referred to as the roll of the eye. With all three angular dimensions of the eye obtained, and eye pose can be identified comprising the three angular dimensions. The identified eye pose may be a numerical representation of the eye represented in a three-dimensional angular coordinate system. Accordingly, the change in the roll rotation of the eye in a third angular dimension may be determined, for example, the change in roll rotation depicted in FIGS. 2A-2B. Such a process of computing the homography between at least two images may be referred to as "matching" iris features 124a.

The computed two angular dimensions (e.g., yaw and pitch) may be used to verify the iris segmentation determined via other segmentation techniques. For example, a segmentation transformation may be solved for simultaneously with the determination of the iris feature (e.g., a keypoint) homography. In one implementation, the segmentation transformation may be solved for, keypoints isolated from the images, the homography solved for from the keypoints, and the segmentation verified, with a final solution being computed (if the segmentation was verified) using the keypoints and the boundary segmentation to compute a single solution.

The numerical representation of iris features 124a may change between two obtained eye images if the iris features 124a are computed directly from the image. For example, perspective distortion and the dilation state of the pupil may change the apparent location of the iris features 124a in the segmented eye. In addition, the numerical representations (e.g., the descriptors) may be distorted and possibly introduce challenges to matching iris features 124a between images. Accordingly in one embodiment, the pupil may be remapped to an equivalent frontal view (e.g., by inverting the homography computed from the limbic boundary), and thereafter computing the iris features 124a from that undistorted image. Such a mapping may also include normalization of the radial dimension extending from the pupillary boundary to the limbic boundary.

Further, an obtained eye image may be converted a polar coordinate representation system (see, e.g., U.S. Pat. No. 5,291,560 to Daugman). In such a representation system, the x-coordinate is equivalent to the angular coordinate in the undistorted image and the y-coordinate is equivalent to a "pseudo-radius" (the radial distance from the pupil boundary). Such a polar image may be normalized to a standard size. In such a case, the iris features 124a and numerical representations are computed on the polar image. Matches between two obtained eye images may be computed relative to numerical representations, defined by that polar image. To find a match between two obtained eye images, the polar transformation and the rectification transformation can be inverted and the location of the iris features 124a in the original image can be computed. In one embodiment, iris features 124a associated with an orientation may be unnecessary. In the computed polar image, the orientation of the iris features 124a may be fixed, independent of roll rotation of the eye.

Although the foregoing examples have been described in the context of identifying an eye pose using iris features, this is for illustration and is not intended to be limiting. In other implementations, any suitable eye feature can be used to identify an eye pose. For example, pupil features may be used to detect changes between eye images, and thus compute the roll angle of the eye.

Example of an Eye Pose Identification with Code-Based Tracking

FIGS. 3A-3B schematically illustrate an example of an iris code identification technique for identifying an eye pose of an eye. This example illustrates the code-based tracking technique using iris features, such as the iris features 124a in FIG. 1. As depicted in FIG. 3A, an image 304a of the eye in a resting pose (e.g., looking straight ahead) can include iris features 124a1. As depicted in FIG. 3B, an image 304b shows a change in the roll angle of the eye by an amount 308a, which angularly shifts the iris features 124a1 in the image 304b relative to their angular position in the resting pose image 304a1. For example, an iris feature 124a1 in the image 304a is shifted in angular position by the angle 308a to appear as a shifted iris feature 124a2 in the image 304b. The image 304b is shown from the resting perspective (e.g., as if the eye were looking straight ahead), which can be achieved using the yaw and pitch angles described above.

The iris in the images 304a, 304b can be mapped (e.g., "unrolled") to the polar representation system with radial coordinate r and angular coordinate γ discussed above. Or in another embodiment, the iris may be first segmented with two angular dimensions mapped to the polar representation system. An iris code 312a, 312b can be extracted from each of the images 304a, 304b, respectively. Due to the rotation of the eye by the angle 308a, the iris features in the iris code 312b will be shifted by a shift amount 308b relative to their position in the iris code 312a. By comparing the iris codes 312a, 312b, the shift amount 308b can be determined. In the polar coordinate system, the shift amount 308b may be measured in pixels, which can be converted into a measure of the angle 308a, e.g., in degrees.

The iris codes can be computed in a variety of ways. For example in some embodiments, iris codes can be computed according to algorithms developed by John Daugman for iris biometrics (see, e.g., U.S. Pat. No. 5,291,560). For example, the iris code can be based on a convolution of the iris image (in polar coordinates) with 2-D bandpass filters (e.g., Gabor filters), and the iris code can be represented as a two bit number (e.g., whether the response to a particular Gabor filter is positive or negative).

In the comparison process of the code-based tracking technique, an initial iris code 312a (e.g., an iris code from a starting eye position, such as from the image 304a) can be recomputed for a window of possible translations (e.g. −10 pixels to +10 pixels) in the third angular dimension. The window can be selected based on the expected amount of roll angle (which corresponds to horizontal translation in the iris code) that user's experience as their eye pose changes or as the HMD shifts, moves, or rotates while being worn by the user. The window may represent a roll angle of less than about 5 degrees, less than about 10 degrees, less than about 20 degrees, less than about 30 degrees, or some other value. In some implementations, the recomputed iris codes are hashed and stored in a binary tree. The shift amount 308b can be calculated by determining a minimum number of differing bits (e.g., a Hamming distance) between the iris codes as currently measured relative to one of the recomputed iris codes from the reference image 304a. The minimum number of differing bits can be selected as the correct rotation along the γ axis. From the displacement 312ab in the γ axis direction of the iris code 312b, the roll angle of the iris (the angle 308a between the image 304b and the image 304a) can be directly computed. For example, if the unrolled image was 512 pixels wide and the displacement corresponding to the best match was 5 pixels, then the roll of the eye is (5 pixels/512 pixels)×360 degrees 3.5 degrees.

Although the foregoing examples have been described in the context of identifying an eye pose using iris features, this is for illustration and is not intended to be limiting. In other implementations, any suitable eye feature can be used to identify an eye pose. For example, pupil features may be used to detect changes between eye images, and thus compute the roll angle of the eye. Additionally, although the foregoing examples have been described in the context of a polar representation, this is for illustration and is not intended to be limiting. In other implementations, any suitable numerical representation for an iris feature mapped to a suitable coordinate system can be used for implementing the code-based tracking technique.

Example Eye Pose Estimation Routine

Figure 4:
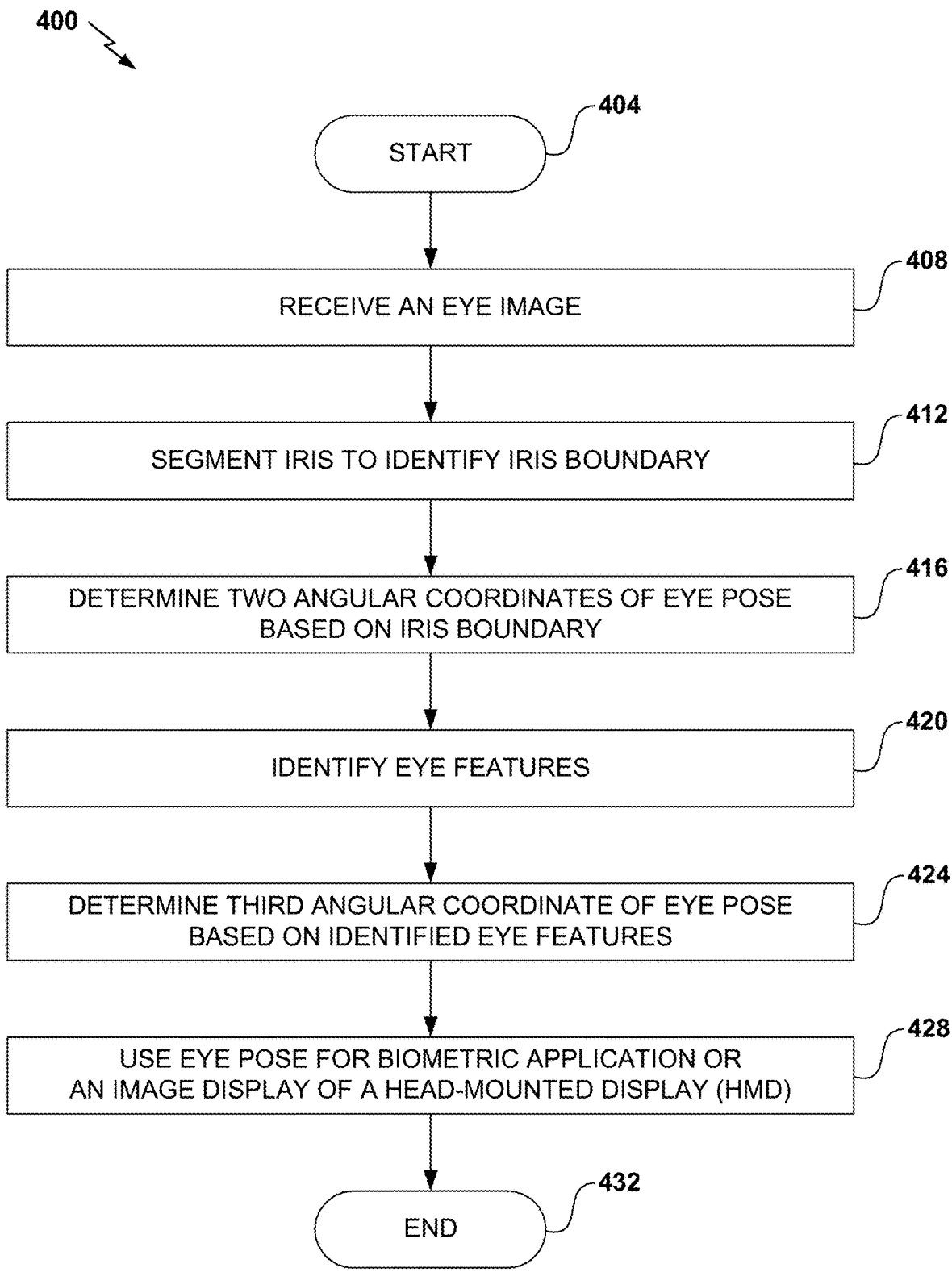
FIG. 4 schematically illustrates an example of an eye pose identification routine.

FIG. 4 is a flow diagram 400 of an illustrative routine 400 for measuring eye pose using embodiments of the FBT and CBT techniques described above. The routine 400 begins at block 404. At block 408, an eye image is received. The eye image can be received from a variety of sources including, but not limited to: an image capture device, a head mounted display system, a server, a non-transitory computer-readable medium, or a client computing device (e.g., a smartphone).

A normal human iris is circular to a high degree of accuracy. The iris will, in general, not appear circular when obtained from a camera image, even in the resting position (e.g., straight ahead) as the camera may not be positioned so as to view the eye from a substantially frontal angle. If the plane of the iris and the plane of the imager are not parallel, for some particular image, then the boundaries of the iris may appear oval or elliptical. Instrumental effects, such as the viewing angle of the camera, may also distort the image so that the iris does not appear circular. At block 412, the iris of the eye from the eye image is segmented to identify a limbic boundary and a pupillary boundary of the iris. As part of the segmentation, the location of the eyelid (which typically blocks part of the iris) may be determined. As described herein, segmenting the iris may not be performed in some implementations; therefore, block 412 is optional.

At block 416, two angular coordinates of eye pose are determined based on an iris boundary (limbic or pupillary), or generally on the iris segmentation. For example, given the intrinsic parameters of the camera that characterize the perspective transformation (e.g., the focal lengths of the lens, the optical center point on the imager surface in pixel coordinates, etc.), it is possible to solve for a perspective transformation at which the iris is being viewed in two angular dimensions. Accordingly, the two angular dimensions that can be determined can be the yaw and pitch of the eye (see, e.g., the angles α and β shown in FIG. 1A). As noted previously, the roll of the eye (the third angular dimension around which rotation does not change the boundary of the iris) may not be solved from the perspective transformation alone.

At block 420, eye features are identified in the eye image. For example, this may occur as described above with respect to a texture or a pattern or a keypoint of the iris in certain locations. A numerical representation of the iris features can be computed, for example, by computing the area around the iris feature, in terms of density of the pixels, in terms of a radius from the iris feature, in terms of an iris code, or by any other method to associate a numerical representation with the iris feature. Further, as described herein, the routine 400 is not limited to features that are only in the iris of the eye and can be applied (additionally or alternatively) to features in the sclera of the eye (outside the iris).

At block 424, a third angular coordinate of eye pose is determined based on the identified eye features. As described above with respect to the feature-based tracking technique at FIGS. 2A-2B and with respect to the code-based tracking technique at FIGS. 3A-3B, the third angular coordinate of eye pose (e.g., the roll angle γ shown in FIG. 1A) can be determined from a change in the angular position of eye feature(s) (iris features or scleral features) between the image (acquired at block 408) and an image of the eye in a reference state (e.g., the resting state in which the eye looks straight ahead). Accordingly, with three angular dimensions of the eye determined, an eye pose for the eye can be identified as represented by a three-dimensional angular coordinate system.

At block 428, the identified eye pose can be used for a biometric application or image display for a head mounted display (HMD). Thus, as can be seen from this example, the eye pose can be identified in accordance with the segmentation of the iris and the identified iris features measured from the segmented eye.

In some implementations, the iris segmentation can be re-estimated using the identified eye pose, and a comparison between the initial iris segmentation and the re-estimated iris segmentation can be performed to verify the consistency of the eye pose estimation. For example, if the re-estimated iris segmentation is substantially the same as the initial iris segmentation (e.g., smaller than a threshold difference), then the eye pose estimate is likely to be accurate. Alternatively, the pose two measurements may be fused into a single measurement (e.g., by computing the underlying pose with the maximum probability of generating both measurements).

In various embodiments, the routine 400 may be performed by a hardware processor (e.g., the local or remote processing modules 528, 532) of a wearable display system 500, for example, as described below with reference to FIG. 5. The routine 400 can be performed for a single eye of a wearer of the HMD or for both eyes of the wearer of the HMD.

Example of a Head Mounted Display Error Rotation Routine

In various embodiments, a routine for determining rotation of a head mounted display relative to a wearer's head can be performed analogously to the routine 400 (in which eye pose is identified from iris features). Typically the angular roll of each eye of a wearer is substantially the same. In the case of a wearable head mounted display, rotation of the HMD relative to the wearer's head can lead to eye roll that is measurably different for each of the wearer's eyes. Accordingly, if angular roll measurements for each of the eyes differ by more than a threshold, an error signal can be generated to indicate that an error has occurred with the wearable head mounted display. For example, in various embodiments, the threshold can be between one and five degrees, between five and ten degrees, or some other rotational amount.

In various embodiments, the angular roll of each eye can be averaged over a series of images, and subsequently compared using this error rotation technique.

In some embodiments, such comparisons may only be performed when the eyes are in the neutral, resting position. In others, this determination may be performed for other gaze directions. In this case, the expected roll of the eye as a result of the natural action of the steering muscles of the eye (e.g., the Medial rectus and Lateral rectus muscles) may be explicitly subtracted before comparison between the two eyes.

Example Applications of Eye Pose Identification

Systems and methods using eye pose identification permit many of the classical problems in image processing to be improved, when addressed within the context of video imagery. Additionally new problems can be addressed. For example, eye pose identification can be used for image classification from a video (e.g., identifying the iris of the eye), as well as for the localization of specific object types within one or more frames of the video (e.g., the location of the upper eyelid). As another example, eye pose identification can be applied to a video for the application of eye-tracking (e.g., determining the orientation or direction of an eye).

In some such applications, as will be further discussed below, a wearable display system can include a processor that performs eye pose identification on video data acquired by an image capture device operatively coupled to (e.g., attached to or included in) the wearable display system. The image capture device may acquire video of the wearer's eye or other components of the wearer's body (e.g., an eyebrow) for use in identifying eye pose.

The use of eye pose identification advantageously permits recognition of eye pose in a video (e.g., acquired from an image capture device in a wearable display system), which may permit improved recognition or classification of objects in the video such as biometric information. For example, a conventional biometric template may have difficulty in determining an eye pose of the eye. However, the eye pose identification approach described herein can identify three angular dimensions of eye pose such as the yaw, pitch, and roll. Thus, by providing the ability to extract biometric information, eye pose identification (as described in FIG. 4 and illustrated in FIGS. 2A-2B and 3) can better track portions of the eye that are not available when using iris segmentation alone and can provide for more accurate iris segmentation used in biometric extraction. The eye pose identification techniques disclosed herein can be used by a head mounted display (e.g., such as in FIG. 5) for biometric extraction.

Example Wearable Display System Using Eye Pose Identification

In some embodiments, display systems can be wearable, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 5:
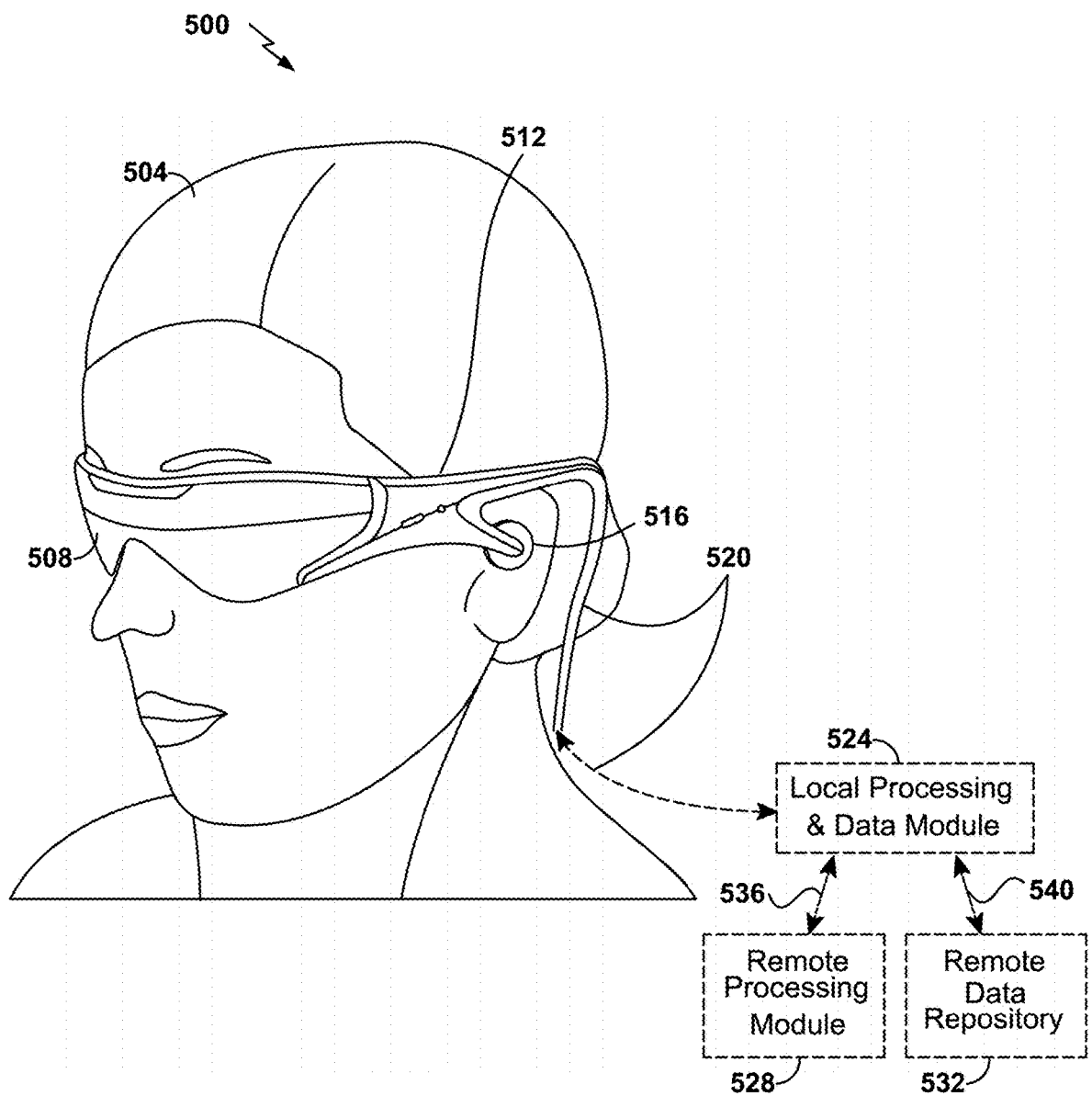
FIG. 5 schematically illustrates an example of a wearable display system.

FIG. 5 illustrates an example of a wearable display system 500 that can be used to present a VR, AR, or MR experience to the wearer 504. The wearable display system 500 may be programmed to perform eye pose identification to provide any of the applications or embodiments described herein. The display system 500 includes a display 508, and various mechanical and electronic modules and systems to support the functioning of that display 508. The display 508 may be coupled to a frame 512, which is wearable by a display system wearer or viewer 504 and which is configured to position the display 508 in front of the eyes of the wearer 504. The display 508 may be a light field display. In some embodiments, a speaker 516 is coupled to the frame 512 and positioned adjacent the ear canal of the user in some embodiments, another speaker, not shown, is positioned adjacent the other ear canal of the user to provide for stereo/shapeable sound control. The display 508 is operatively coupled 520, such as by a wired lead or wireless connectivity, to a local data processing module 524 which may be mounted in a variety of configurations, such as fixedly attached to the frame 512, fixedly attached to a helmet or hat worn by the user, embedded in headphones, or otherwise removably attached to the user 504 (e.g., in a backpack-style configuration, in a belt-coupling style configuration).

The frame 512 can have one or more cameras attached or mounted to the frame 512 to obtain images of the wearer's eye(s). In one embodiment, the camera(s) may be mounted to the frame 512 in front of a wearer's eye so that the eye can be imaged directly. In other embodiments, the camera can be mounted along a stem of the frame 512 (e.g., near the wearer's ear). In such an embodiment, the display 512 may be coated with a material that reflects light from the wearer's eye back toward the camera. The light may be infrared light, since iris features are prominent in infrared images.

The local processing and data module 524 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 512 or otherwise attached to the wearer 504), such as image capture devices (such as cameras), microphones, inertial measurement units, accelerometers, compasses, GPS units, radio devices, and/or gyros; and/or (b) acquired and/or processed using remote processing module 528 and/or remote data repository 532, possibly for passage to the display 508 after such processing or retrieval.

The local processing and data module 524 may be operatively coupled by communication links 536, 540, such as via a wired or wireless communication links, to the remote processing module 528 and remote data repository 532 such that these remote modules 528, 532 are operatively coupled to each other and available as resources to the local processing and data module 524. The image capture device(s) can be used to capture the eye images used in the eye pose identification procedures.

In some embodiments, the remote processing module 528 may comprise one or more processors configured to analyze and process data and/or image information such as video information captured by an image capture device. The video data may be stored locally in the local processing and data module 524 and/or in the remote data repository 532. In some embodiments, the remote data repository 532 may comprise a digital data storage facility, which may be available through the internet or other networking configuration in a "cloud" resource configuration. In some embodiments, all data is stored and all computations are performed in the local processing and data module 524, allowing fully autonomous use from a remote module.

In some implementations, the local processing and data module 524 and/or the remote processing module 528 are programmed to perform embodiments of identifying an eye-pose as described herein. For example, the local processing and data module 524 and/or the remote processing module 528 can be programmed to perform embodiments of the routine 400 described with reference to FIG. 4. The local processing and data module 524 and/or the remote processing module 528 can be programmed to use the eye pose identification techniques disclosed herein in biometric extraction, for example to identify or authenticate the identity of the wearer 504, or in eye gaze or eyelid shape estimation or pose estimation, for example to determine a direction toward which each eye is looking. The image capture device can capture video for a particular application (e.g., video of the wearer's eye for an eye-tracking application or video of a wearer's hand or finger for a gesture identification application). The video can be analyzed using the eye pose identification techniques by one or both of the processing modules 524, 528. With this analysis, processing modules 524, 528 can perform eye pose identification or detection and/or biometric extraction, etc. As an example, the local processing and data module 524 and/or the remote processing module 528 can be programmed to store obtained eye images from cameras attached to the frame 512. In addition, the local processing and data module 524 and/or the remote processing module 528 can be programmed to process the eye images using the feature-based tracking or code based tracking techniques described herein (e.g., the routine 400) to identify an eye pose of a wearer of the wearable display system 500. In some cases, off-loading at least some of the eye pose identification to a remote processing module (e.g., in the "cloud") may improve efficiency or speed of the computations. Various parameters for eye pose identification (e.g., weights, bias terms, random subset sampling factors, number, and size of filters (e.g., Sobel derivative operator), etc.) can be stored in data modules 524 and/or 532.

The results of the video analysis (e.g., the estimated eye pose) can be used by one or both of the processing modules 524, 528 for additional operations or processing. For example, in various applications, biometric identification, eye-tracking, recognition, or classification of objects, poses, etc. may be used by the wearable display system 500. For example, video of the wearer's eye(s) can be used for eye pose identification, which, in turn, can be used by the processing modules 524, 528 to determine the direction of the gaze of the wearer 504 through the display 508. The processing modules 524, 528 of the wearable display system 500 can be programmed with one or more embodiments of eye pose identification to perform any of the video or image processing applications described herein.

Additional Aspects

The eye pose identification techniques described herein can be applied to an image (e.g., from a video frame). Eye pose identification can be viewed together as a single process and/or methodology for processing an image of an eye.

In a 1st aspect, a method for processing an eye image is disclosed. The method is under control of a hardware computer processor and comprises: segmenting an iris of an eye in an eye image to obtain pupillary and limbic boundaries of the eye; determining two angular coordinates of a first eye pose measurement using the pupillary and limbus boundaries of the eye; identifying an iris feature of the eye; determining a third angular coordinate of the first eye pose measurement using the identified iris feature; and utilizing the first eye pose measurement for display of an image or a biometric application.

In a 2nd aspect, the method of aspect 1, wherein identifying the iris feature of the eye comprises: determining a descriptor for the iris feature, the descriptor comprising a numerical representation of the iris feature.

In a 3rd aspect, the method of aspect 1 or aspect 2, wherein determining the third angular coordinate comprises determining the third angular coordinate using a feature-based tracking technique, a code-based tracking technique, or a combination thereof.

In a 4th aspect, the method of aspect 1 or aspect 2, wherein determining the third angular coordinate comprises determining the third angular coordinate using a feature-based tracking technique and a code-based tracking technique.

In a 5th aspect, the method of aspect 4, wherein the feature-based eye tracking technique and the code-based tracking technique are performed substantially simultaneously to verify consistency of the determined eye pose.

In a 6th aspect, the method of any one of aspects 1-5, wherein determining the third angular coordinate comprises determining, based at least partly on the iris feature, a homography between the eye image and a reference eye image.

In a 7th aspect, the method of any one of aspects 1-6, wherein determining the third angular coordinate comprises determining, based at least partly on the iris feature, a shift between an iris code generated from the eye image and an iris code generated from a reference eye image.

In a 8th aspect, the method of any one of aspects 1-7, wherein the iris feature comprises to an area of the iris with a different texture, a pattern in the iris, or a keypoint of the iris.

In a 9th aspect, the method of any one of aspects 1-8, wherein the first eye pose measurement is determined for a first eye of a user and a second eye pose measurement is determined for a second eye of the user, and wherein an average of the first eye pose measurement and the second eye pose measurement is used as a single estimate of the eye pose of the user.

In a 10th aspect, a hardware processor is disclosed. The hardware processor is programmed to perform the method of any one of aspects 1-9.

In a 11th aspect, a wearable display system for determining an eye pose, the wearable display system comprising: the hardware processor of aspect 10; and an image device configured to transmit eye images of a wearer of the wearable display system to the hardware processor.

In a 12th aspect, the wearable display system of aspect 11, wherein the hardware processor is further programmed to perform the method of any one of aspects 1-9 to determine biometric information of the eye of the wearer of the wearable display system.

In a 13th aspect, a head mounted display system is disclosed. The head mounted display system comprises: an image capture device configured to capture an eye image; a hardware processor programmed to: receive the eye image from the image capture device; determine a pitch and a yaw of the eye based at least partly on the eye image; determine a roll of the eye based at least partly on an eye feature in the eye image; and determine an eye pose of the eye image based at least partly on the pitch, the yaw, and the roll.

In a 14th aspect, the head mounted display system of aspect 13, wherein to determine the roll of the eye, the hardware processor is programmed to determine a homography between the eye image and a reference eye image.

In a 15th aspect, the head mounted display system of aspect 13 or aspect 14, wherein to determine the roll of the eye, the hardware processor is programmed to utilize a polar coordinate representation of the eye image.

In a 16th aspect, the head mounted display system of any one of aspects 13-15, wherein to determine the roll of the eye, the hardware processor is programmed to compare an iris code of the eye image to an iris code from a reference eye image.

In a 17th aspect, the head mounted display system of any one of aspects 13-16, wherein the hardware processor is further programmed to: determine biometric data of the eye using the eye pose of the eye image.

In a 18th aspect, the head mounted display system of any one of aspects 13-17, wherein the eye feature comprises an iris feature.

In a 19th aspect, the head mounted display system of aspect 18, wherein the iris feature comprises a texture, a pattern, or a keypoint in the iris.

In a 20th aspect, the head mounted display system of any one of aspects 13-17, wherein the eye feature comprises a scleral feature.

In a 21st aspect, the head mounted display system of aspect 20, wherein the scleral feature comprises a blood vessel.

In a 22nd aspect, the head mounted display system of any one of aspects 13-21, wherein the processor is further programmed to segment the iris of the eye in the eye image.

In a 23rd aspect, a method for detecting an error in operation of a head mounted display (HMD) is disclosed. The method is under control of a hardware computer processor and comprises: determining a first roll angle of a first eye of a wearer of the HMD; determining a second roll angle of a second eye of the wearer of the HMD; and detecting an error in operation of the head mounted display operation based at least partly on a comparison of the first roll angle and the second roll angle.

In a 24th aspect, the method of aspect 23, wherein detecting the error in the operation of the head mounted display comprises: determining that a difference between the first roll angle and the second roll angle exceeds an error threshold.

In a 25th aspect, the method of any one of aspects 23 or 24, further comprising: generating an error signal based on the detected error.

In a 26th aspect, the method of any one of aspects 23-25, wherein detecting the error in the operation of the head mounted display operation comprises tracking an average value for a roll angle in the plurality of eye images.

In a 27th aspect, the method of any one of aspects 23-26, wherein determining the first roll angle or determining the second roll angle comprise performing the method of any one of aspects 1-9.

In a 28th aspect, an apparatus is disclosed. The apparatus comprises a camera configured to take an image of an eye; and a processing system programmed to analyze the image of the eye to estimate an eye pose of the eye.

In a 29th aspect, the apparatus of aspect 28, wherein the camera is a digital camera.

In a 30th aspect, the apparatus of any one of aspects 28-29, wherein to analyze the image of the eye to estimate the eye pose of the eye, the processing system is programmed to determine a relative transformation between a current eye pose and a reference eye pose.

In a 31st aspect, the apparatus of aspect 30, wherein to determine the relative transformation between the current eye pose and the reference eye pose, the processing system is programmed to analyze eye features in the eye.

In a 32nd aspect, the apparatus of aspect 31, wherein to analyze the eye features in the eye, the processing system is programmed to analyze iris features or scleral features in the eye.

In a 33rd aspect, the apparatus of aspect 32, wherein to analyze the eye features in the eye, the processing system is programmed to analyze a ring of a limbus of an iris of the eye.

In a 34th aspect, the apparatus of aspect 33, wherein to analyze the ring of the limbus of the iris of the eye, the processing system is programmed to determining two of three dimensions of an angular transformation that relates the limbus boundary to the coordinate frame of the camera.

In a 35th aspect, the apparatus of aspect 34, wherein the processing system is further programmed to perform a search of an angular window to determine an offset for an optimal match of iris-codes.

In a 36th aspect, the apparatus of aspect 35, wherein the processing system is further programmed to measure a roll angle corresponding to a third "roll" degree of freedom of the angular transformation using the offset.

In a 37th aspect, the apparatus of any one of aspects 33-36, wherein the processing system is programmed to analyze the iris features or the scleral features in the eye and to analyze the ring of the limbus of the iris of the eye sequentially or as part of a simultaneous optimization.

In a 38th aspect, the apparatus of any one of aspects 31-37, wherein the processing system is further programmed to extract eye features.

In a 39th aspect, the apparatus of aspect 38, wherein the processing system is further programmed to: convert an iris image to polar form prior to the eye features are extracted; and inversely mapping the eye features back to image coordinates.

In a 40th aspect, the apparatus of any one of aspects 28-39, wherein the apparatus is a head mounted-display.

In a 41st aspect, the apparatus of aspect 40, wherein the eye is a one eye of a wearer of the head mounted-display, wherein the roll angle comprises a roll angle of the one eye of the wearer of the head mounted-display, and wherein the processing system is further programmed to: measure a roll angle corresponding to a third "roll" degree of freedom of another eye of the wearer of the head mounted display; and generates an error signal when the two roll angles do not match.

In a 42nd aspect, the apparatus of aspect 41, wherein the processing system is programmed to: determine an average value of the two roll angles as a single estimate of a roll dimension of the angular measurement.

In a 43rd aspect, the apparatus of any one of aspects 36-42, wherein the roll angle of the eye (torsion) is measured to correct the visual axis of the eye.

Conclusion

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head mounted display (HMD) system comprising:
one or more image capture devices configured to capture, at a time of an error detection of the HMD system, at least a first eye image of a first eye of a wearer of the HMD system and a second eye image of a second eye of the wearer of the HMD system; and
a hardware processor programmed to:
determine, based at least on the first eye image, a first roll angle of the first eye of the wearer of the HMD system, the first roll angle corresponding to a rotation of the first eye about a first optical axis orthogonal to a central plane of a first pupil of the first eye;
determine, based at least on the second eye image, a second roll angle of the second eye of the wearer of the HMD system, the second roll angle corresponding to a rotation of the second eye about a second optical axis orthogonal to a central plane of a second pupil of the second eye; and detect the error in operation of the HMD system based at least partly on a discrepancy between the first roll angle and the second roll angle.

2. The system of claim 1, wherein the hardware processor is further programmed to generate an error signal based on the detected error.

3. The system of claim 2, wherein the error signal is displayed to the wearer of the HMD system.

4. The system of claim 1, wherein detecting the error in the operation of the HMD system comprises tracking an average value for a roll angle in a plurality of eye images.

5. The system of claim 1, wherein determining the first roll angle or determining the second roll angle comprises determining the first roll angle or determining the second roll angle using a feature-based tracking technique, a code-based tracking technique, or a combination thereof.

6. The system of claim 1, wherein the hardware processor is configured to measure noise suppression using the discrepancy between the first roll angle and the second roll angle.

7. The system of claim 1, wherein the error in operation comprises the HMD system being rotated relative to the wearer's head.

8. The system of claim 1, wherein detecting the error in operation comprises determining an average value of the first roll angle and the second roll angle as a single estimate of a roll dimension of angular measurement.

9. The system of claim 1, wherein the first roll angle or the second roll angle are measured to correct a visual axis of the first eye or the second eye.

10. The system of claim 1, wherein determining the first roll angle and determining the second roll angle are performed when the first eye and the second eye are in neutral positions.

11. The system of claim 1, wherein determining the first roll angle and determining the second roll angle are performed when the first eye and the second eye are in gaze positions that are different from neutral positions.

12. The system of claim 11, wherein the hardware processor is programmed to:
subtract from the first roll angle a first expected roll of the first eye as a result of natural actions of steering muscles of the first eye; and
subtract from the second roll angle a second expected roll of the second eye as a result of natural actions of steering muscles of the second eye.

13. A method for detecting an error in operation of a head-mounted display (HMD), the method comprising:
under control of a hardware computer processor:
capturing a first eye image of a first eye of a wearer of the HMD and a second eye image of a second eye of the wearer of the HMD, wherein the first eye image does not include the second eye and wherein the second eye image does not include the first eye;
determining, based on the first eye image and not based on any image of the second eye, a first roll angle of the first eye of the wearer of the HMD, the first roll angle corresponding to a rotation of the first eye about a first optical axis orthogonal to a central plane of a first pupil of the first eye;
determining, based on the second eye image and not based on any image of the first eye, a second roll angle of a second eye of the wearer of the HMD, the second roll angle corresponding to a rotation of the second eye about a second optical axis orthogonal to a central plane of a second pupil of the second eye; and
detecting an error in operation of the HMD based at least partly on a discrepancy between the first roll angle and the second roll angle.

14. The method of claim 13, wherein detecting the error in the operation of the head mounted display comprises:
determining that a difference between the first roll angle and the second roll angle exceeds an error threshold.

15. The method of claim 14, wherein the error threshold is in a range between one degree and ten degrees.

16. The method of claim 13, further comprising generating an error signal based on the detected error.

17. The method of claim 13, wherein detecting the error in the operation of the head mounted display operation comprises tracking an average value for a roll angle in a plurality of eye images.

18. The method of claim 13, wherein determining the first roll angle or determining the second roll angle comprise determining the first roll angle or determining the second roll angle using a feature-based tracking technique, a code-based tracking technique, or a combination thereof.

19. The method of claim 13, further comprising measuring noise suppression using the discrepancy between the first roll angle and the second roll angle.

20. The method of claim 13, wherein the error in operation comprises the HMD being rotated relative to the wearer's head.

21. The method of claim 13, wherein detecting the error in operation comprises determining an average value of the first roll angle and the second roll angle as a single estimate of a roll dimension of angular measurement.

22. The method of claim 13, wherein the first roll angle or the second roll angle are measured to correct the visual axis of the first eye or the second eye.

23. The method of claim 13, wherein determining the first roll angle and determining the second roll angle are performed when the first eye and the second eye are in neutral positions.

24. The method of claim 13, wherein determining the first roll angle and determining the second roll angle are performed when the first eye and the second eye are in gaze positions that are different from neutral positions.

25. The method of claim 24, further comprising:
subtracting from the first roll angle a first expected roll of the first eye as a result of natural actions of steering muscles of the first eye; and
subtracting from the second roll angle a second expected roll of the second eye as a result of natural actions of steering muscles of the second eye.

26. The system of claim 1, wherein the first roll angle of the first eye is determined based on a difference between a reference location of an iris feature in a reference image of the first eye and a location of the iris feature in the first eye image.

27. The method of claim 13, wherein determining the first roll angle of the first eye comprises comparing a reference location of an iris feature in a reference image of the first eye to a location of the iris feature in a subsequent eye image of the first eye.

28. A method for detecting an error in operation of a head-mounted display (HMD), the method comprising:
under control of a hardware computer processor:
capturing, at a time of an error detection of the HMD, a first eye image of a first eye of a wearer of the HMD and a second eye image of a second eye of the wearer of the HMD;
determining a first roll angle of the first eye of the wearer of the HMD, the first roll angle corresponding to a rotation of the first eye about a first optical axis orthogonal to a central plane of a first pupil of the first eye;

determining a second roll angle of a second eye of the wearer of the HMD, the second roll angle corresponding to a rotation of the second eye about a second optical axis orthogonal to a central plane of a second pupil of the second eye; and detecting the error in operation of the HMD based at least partly on a discrepancy between the first roll angle and the second roll angle.

29. A head mounted display (HMD) system comprising:

one or more image capture devices configured to capture at least a first eye image of a first eye of a wearer of the HMD system and a second eye image of a second eye of the wearer of the HMD system, wherein the first eye image does not include the second eye and wherein the second eye image does not include the first eye; and a hardware processor programmed to:

determine, based on the first eye image and not based on any image of the second eye, a first roll angle of the first eye of the wearer of the HMD system, the first roll angle corresponding to a rotation of the first eye about a first optical axis orthogonal to a central plane of a first pupil of the first eye;

determine, based on the second eye image and not based on any image of the first eye, a second roll angle of the second eye of the wearer of the HMD system, the second roll angle corresponding to a rotation of the second eye about a second optical axis orthogonal to a central plane of a second pupil of the second eye; and detect an error in operation of the HMD system based at least partly on a discrepancy between the first roll angle and the second roll angle.

* * * * *